United States Patent [19]
Konopka

[11] Patent Number: 4,754,387
[45] Date of Patent: Jun. 28, 1988

[54] START-UP CIRCUIT FOR A SWITCH MODE POWER SUPPLY

[75] Inventor: John G. Konopka, Ingleside, Ill.

[73] Assignee: Zenith Electronics Corporation, Glenview, Ill.

[21] Appl. No.: 7,049

[22] Filed: Jan. 27, 1987

[51] Int. Cl.[4] ............................................. H02P 13/00
[52] U.S. Cl. ........................................ 363/49; 363/86; 323/901
[58] Field of Search ...................... 363/49, 86, 89, 126; 323/901

[56] References Cited

U.S. PATENT DOCUMENTS

| | | | |
|---|---|---|---|
| 3,868,562 | 2/1975 | Marshall | 363/86 X |
| 4,246,634 | 1/1981 | Purol | 363/49 |
| 4,675,798 | 6/1987 | Jost et al. | 363/86 X |

FOREIGN PATENT DOCUMENTS 0079315  6/1981  Japan ..................................... 363/86

Primary Examiner—Peter S. Wong

[57] ABSTRACT

A start-up circuit for a switch mode power supply includes a transformer supplying a full wave rectifier and developing a reference potential from a zener diode connected at the output thereof. An SCR has its anode-cathode circuit connected between the rectifier output and the input terminal of the switch mode power supply and its gate coupled to the zener diode. The power supply applies a boot strap voltage, higher than the reference potential, to its input terminal which back biases the gate of the SCR. The transformer is, therefore, effectively disconnected from the switch mode power supply after start-up. The start-up circuit also can function as a voltage regulator in which the rectifiers conduct as needed during the AC voltage ripple peaks to maintain an output voltage determined by the reference potential.

2 Claims, 1 Drawing Sheet

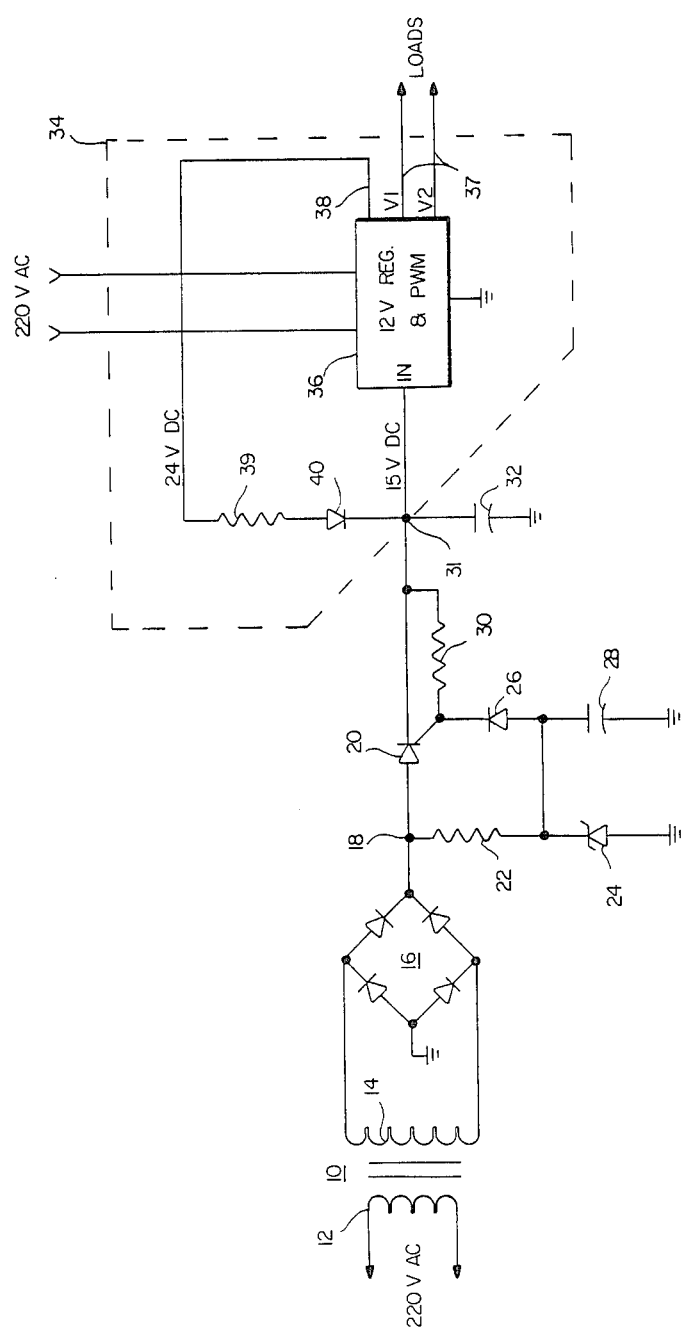

START-UP CIRCUIT FOR A SWITCH MODE POWER SUPPLY

BACKGROUND OF THE INVENTION AND PRIOR ART

This invention relates generally to automatic switches and specifically to start-up circuits for switched-type power supplies, sometimes referred to as switch mode power supplies.

Switched-type power supplies have grown in popularity because of their low cost, and ability to deliver DC power to loads such as computer banks, with minimum internal losses. In general, a switched power supply includes a pulse width modulation (PWM) means for supplying a variable load current and a regulator for maintaining the output load voltage at a precise value. The power supply usually includes a so-called boot strap voltage which is a regulated voltage that is coupled back to the input terminal of the regulator. The power supply may be provided with a start-up circuit since the boot strap voltage is not produced until the regulator is running.

In large computer installations, for example, the power for the computer banks may be taken from 220 volt AC power line or mains and a start-up transformer is incorporated for initiating the switched power supply or supplies. Unfortunately, the input or line voltage is often subject to wide fluctuations due to the varying loads imposed upon the utility company power lines. The range of line voltages on a conventional 220 volt AC line, for example, may be from 180 volts, during a brown-out or extremely low power condition, to 250 or more volts during an over-voltage condition. Consequently, the start-up transformer, which is designed to produce a particular output voltage during low line conditions, will have an output voltage 1.4 times higher during high line conditions. The regulator in the power supply must be capable of maintaining the desired output voltage during these extremes and energy due to the excess voltage is dissipated as heat in the regulator as well as in the transformer.

One aspect of the invention solves this prior art problem by providing a start-up transformer arrangement that automatically "disconnects" from the switched power supply when the power supply boot strap voltage comes up. In so doing, the transformer is, in essence, operated without a load and the energy dissipation in the transformer under high line voltage conditions is minimal. Accordingly, the transformer may be significantly reduced in size. Also, the high line voltage is not permitted to raise the input voltage to the power supply, and therefore, the regulator in the power supply need not dissipate undue amounts of energy.

Another aspect of the invention, which is not fully utilized in the described preferred embodiment, lies in its regulating ability. Should the boot strap voltage, for some reason, fall below its normal level, the circuit of the invention will sense the lower voltage and "reconnect" the transformer and rectifier arrangement to restore and maintain the input voltage applied to the regulator at its normal level.

OBJECTS OF THE INVENTION

A principal object of the invention is to provide a novel start-up circuit for a switched power supply.

Another object of the invention is to provide a start-up circuit for a switched power supply that automatically disconnects when the power supply is energized.

A further object of the invention is to provide a novel voltage regulator.

Still another object of the invention is to provide a start-up circuit for a switched power supply that has minimum dissipation.

BRIEF DESCRIPTION OF THE DRAWING

These and other objects and advantages of the invention will be apparent upon reading the following description in conjunction with the drawing, the single FIGURE of which is a partial schematic diagram of the circuit of the invention.

DESCRIPTION OF THE PREFERRED EMBODIMENT

Referring to the single FIGURE of the drawing, a start-up transformer 10 has a primary winding 12 which is connectable to a source of 220 volt AC input voltage. A secondary winding 14 of transformer 10 is connected to a bridge-type diode rectifier arrangement for developing an output voltage, consisting of unfiltered pulsating full wave DC, between an output terminal 18 and ground. A reference potential is developed by means of a resistor 22 and a zener diode 24 connected between output terminal 18 and ground. Output terminal 18 is also connected to the anode of a silicon-controlled rectifier (SCR) 20 having its cathode connected to the input terminal 31 of a switched power supply 34, comprising the components within the dashed lines. The gate electrode of SCR 20 is connected to input terminal 31 through a small (low value) resistor 30 and to ground through the series connection of a diode 26 and a capacitor 28, the junction of which is connected to zener diode 24. A large electrolytic filter capacitor 32 is connected from input terminal 31 to ground.

Switched power supply 34 includes a linear 12 volt regulator and pulse width modulator 36 indicated in block form and having an input connected to input terminal 31 and a plurality or outputs. Two of the output leads 37, labelled V1 and V2, supply various load circuits (not shown). Another output lead 38 develops a regulated boot strap voltage of approximately 24 volts DC which is applied, through a resistor 39 and a diode 40, back to input terminal 31. The voltage developed at input terminal 31 from the boot strap voltage is 15 volts DC.

In operation, zener diode 24 develops a reference potential of approximately 14 volts DC across it. This reference potential is maintained substantially constant over a very wide range of line voltages across primary winding 12 of transformer 10 and is supplied through diode 26 to the gate electrode of SCR 20. Assuming the switched power supply has just been turned on, capacitor 32 is in a discharged state. Consequently, the cathode of SCR 20 is at ground potential and SCR 20 is forward biased because its gate voltage is positive with respect to its cathode voltage. SCR 20 therefore conducts current from output terminal 18 to input terminal 31 and begins to charge capacitor 32. This continues for a few cycles of the AC line voltage as capacitor 32 develops a DC voltage thereacross. As switched power supply 34 begins to operate, the boot strap voltage developed on lead 38 is applied to input terminal 31. As the voltage at input terminal 31 rises to 15 volts, the cathode-gate junction of SCR 20 is back biased and SCR 20 is cut off, that is, it ceases conduction. Capacitor 32 is charged to 15 volts DC and the switched power supply operates normally from its 220 volt AC connection lines. Start-up transformer 10 consequently "sees" very little load connected to output terminal 18 and draws very little power from the 220 volt line.

The start-up circuit, that is, the transformer 10 and rectifier bridge 16, is designed to develop a peak pulsating voltage at output terminal 18 that is substantially higher than the 15 volts DC normally supplied to input terminal 31. Under very low input line voltage conditions, the voltage at output terminal 18 will still be sufficient to develop about 14 volts DC at input terminal 31. Under an over-voltage or high line condition, that is, when transformer 10 is essentially unloaded, the transformer dissipates minimum power. Consequently, transformer 10 may be sized to supply only the brief start-up current required for switched power supply 34. As alluded to above, with the start-up circuit of the invention, input terminal 31 is "isolated" from the effects of high line voltages at the primary of transformer 10. Since the voltage at input terminal 31 remains at 15 volts DC, the regulator in regulator and PWM 36, need not dissipate excessive power that would result from voltages in excess of 15 volts DC at input terminal 31.

To illustrate the second aspect of the invention, switched power supply 34 may be replaced by a conventional load circuit, with the addition of a few stages of filtering, since the power supplied from the start-up circuit to terminal 31 has a significant AC ripple content. Should such a load circuit be connected to input terminal 31 in place of the switched power supply, it may readily be seen that the start-up circuit will function as a voltage regulator and maintain the voltage developed across capacitor 32 constant despite variations in input line voltage and output load current. The regulating action is based upon the voltage drop in the secondary winding 14 of transformer 10, the energy storage rate of filter capacitor 32 and the SCR cutting off for one or more AC ripple voltage cycles, which controls current flow to capacitor 32 and thereby maintains the appropriate voltage at terminal 31. Thus, for a large output current, SCR 20 will conduct on practically every cycle of the AC ripple voltage at output terminal 18. Should the load current requirement decrease (or the input voltage rise), the regulator will turn on later in the AC ripple voltage cycle (phase shift) and then literally stop and skip cycles as needed. Thus SCR 20 will not be driven conductive for every cycle of the AC ripple voltage. This feature of the regulator contributes to its efficient operation.

What has been described is a novel start-up circuit for a switched power supply that electrically removes itself from the circuit when the power supply is energized. The inventive start-up circuit utilizes an SCR switch and a reference potential and can also function as a regulator circuit for maintaining a voltage at a constant level.

It is recognized that numerous changes and modifications in the described embodiment of the invention will be apparent to those skilled in the art without departing from its true spirit and scope. The invention is to limited only as defined in the claims.

What is claimed is:

1. In combination:
   a switched power supply means including an input terminal and bootstrap voltage means for developing and applying a predetermined DC voltage to said input terminal;
   means connecting said switched power supply means to a source of AC power;
   a start-up transformer having a primary winding for connection to said source of AC power and a secondary winding;
   rectifier means coupled across said secondary winding for developing a pulsating DC output voltage substantially larger than said predetermined DC voltage;
   a resistor and a zener diode circuit for developing a reference potential substantially equal to said predetermined DC voltage; and
   a silicon-controlled rectifier connected between said rectifier means and said input terminal and having a gate electrode supplied with said reference potential whereby said silicon-controlled rectifier is rendered conductive only when the voltage at said input terminal is below said predetermined DC voltage.

2. The combination of claim 1, further including an electrolytic capacitor connected to said input terminal.

* * * * *